United States Patent [19]

Martin et al.

[11] 4,194,651
[45] Mar. 25, 1980

[54] DISPENSING AND MIXING MEANS FOR WATER AND DEHYDRATED COFFEE

[75] Inventors: Ernest N. Martin, Escondido; Michael L. Keirns, Alta Loma, both of Calif.

[73] Assignee: Societe d'Assistance Technique pour Produits Nestle S.A., Lausanne, Switzerland

[21] Appl. No.: 846,904

[22] Filed: Oct. 31, 1977

[51] Int. Cl.² ............................................. B67D 1/16
[52] U.S. Cl. .................................. 222/108; 222/129.4
[58] Field of Search .......... 222/129.3, 129.4, 146 HE, 222/183, 108

[56] References Cited

U.S. PATENT DOCUMENTS

| 2,755,000 | 7/1956 | Parre | 222/146 HE X |
| 2,843,293 | 7/1958 | Burgoyne | 222/129.4 |
| 3,133,675 | 5/1964 | Broadhurst | 222/129.4 |

Primary Examiner—Stanley H. Tollberg
Attorney, Agent, or Firm—Georges A. Maxwell

[57] ABSTRACT

A beverage dispensing machine comprising a hopper holding particulate dehydrated beverage concentrate, dispensing a device including a dispensing duct intermittently transporting a predetermined volume of concentrate from the hopper out through the dispensing duct into a mixing funnel, a water supply delivering a predetermined volume of water into the funnel to establish reconstituted beverage therein, an outlet tube on the funnel to exhaust moisture ladened air and to drain beverage therefrom, a case about the hopper and defining a compression chamber, an air pump delivering air greater than atmospheric pressure into the compression chamber to cool said hopper and the concentrate therein, an air outlet opening in the case about the dispensing duct and communicating with the funnel, whereby air flowing through the outlet opening about the dispensing duct and into the funnel establishes a minus pressure which draws air outward through the duct and from the hopper and prevents the flow of moisture ladened air inward through that duct and into the hopper; air moving into the funnel moves out through said tube to transport beverage and moisture ladened air out of the funnel and tube.

5 Claims, 6 Drawing Figures

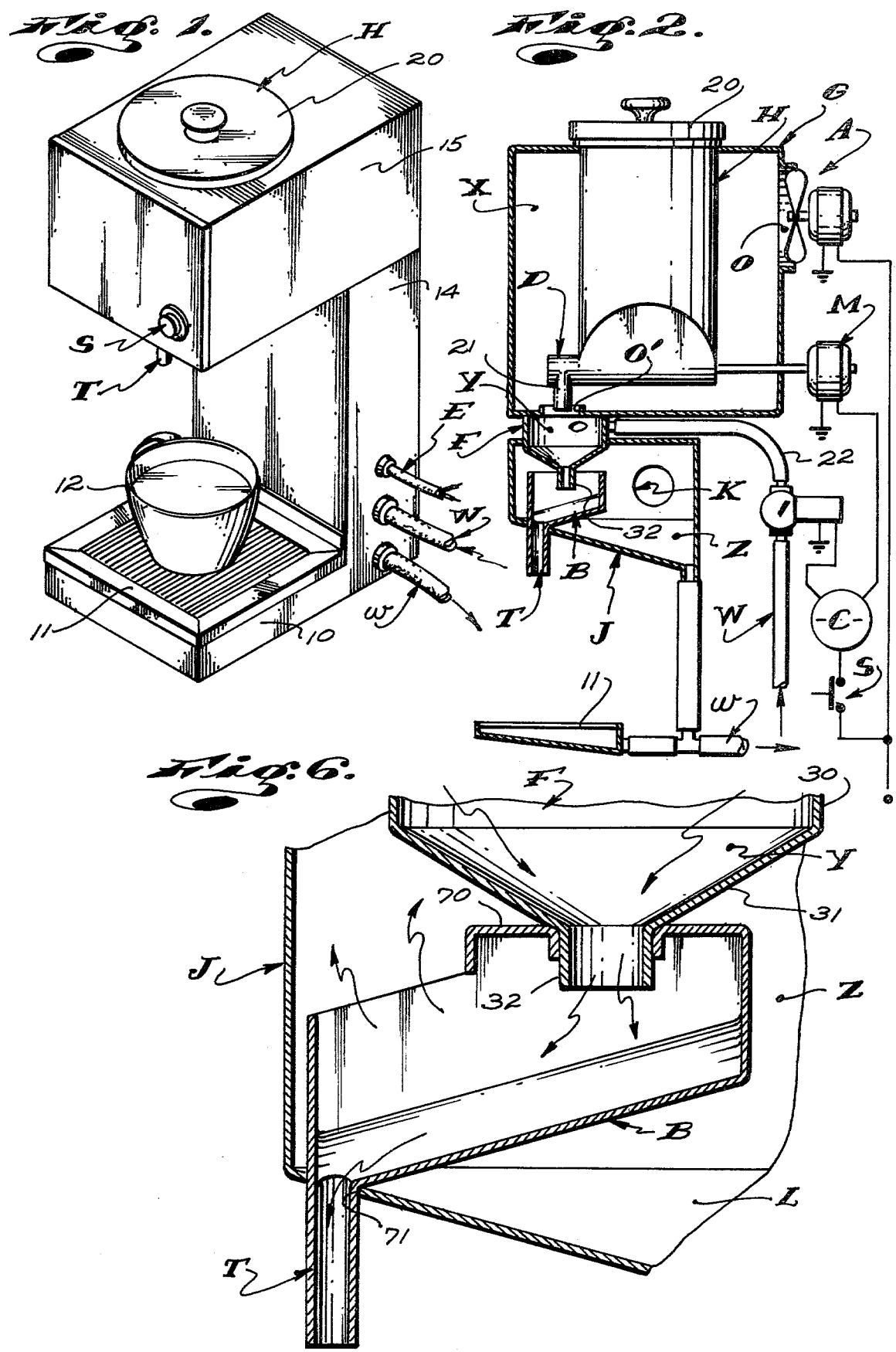

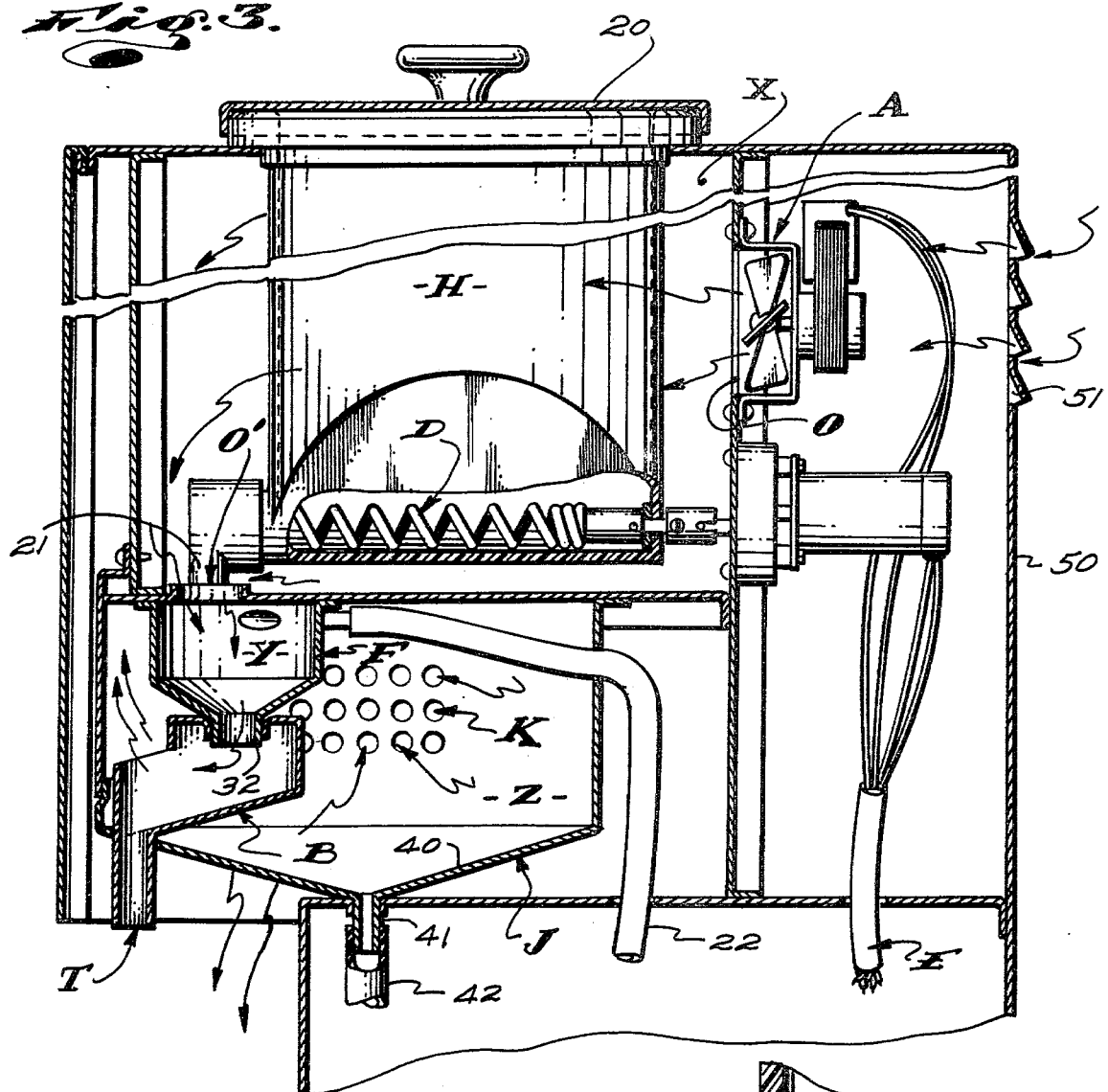
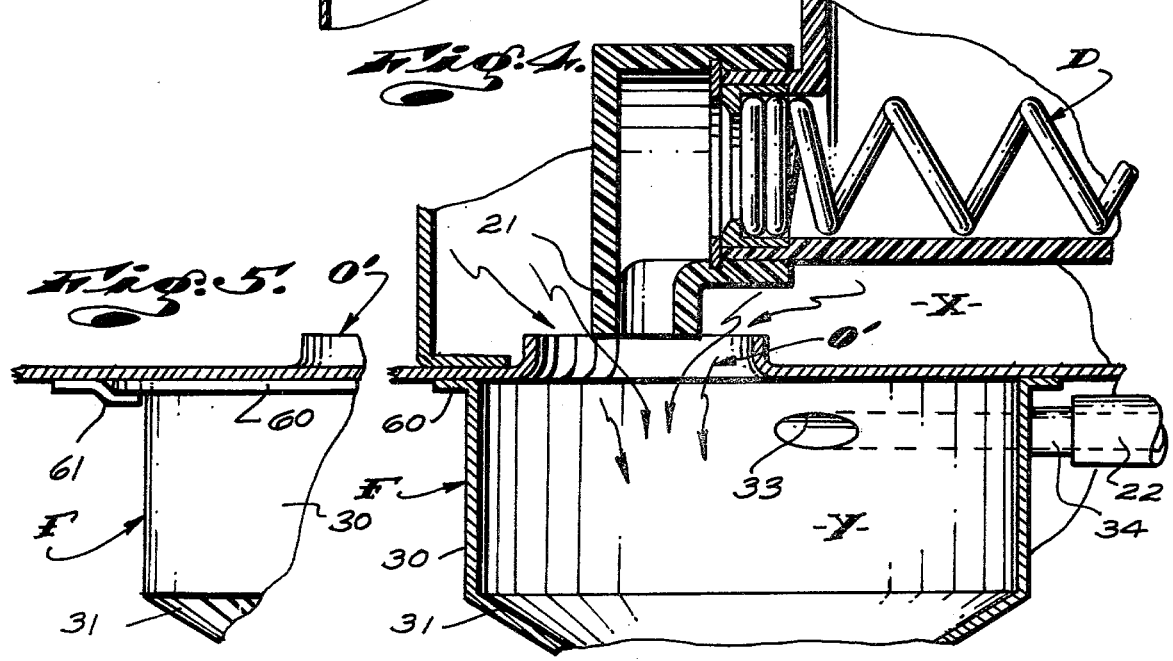

DISPENSING AND MIXING MEANS FOR WATER AND DEHYDRATED COFFEE

This invention relates to the art of brewing and dispensing hot beverages and is particularly concerned with improved means for storing and dispensing dehydrated beverage concentrates, mixing such concentrates with water and for dispensing reconstituted beverage.

In the art to which this invention relates, dehydrated beverage concentrates are commonly fine particulate, granular or powdered materials which are quite fluid. Such concentrates are hygroscopic in nature and are such that when they are permitted to absorb any appreciable amount of moisture, their particulate structure breaks down and they become sticky and non-fluid masses. Additionally, such concentrates are subject to rather rapid degradation and melt or break down into sticky masses when they are subjected to excessive heat. Further, excessive heat tends to rapidly drive off those aeromatics which impart the necessary and desired essence and flavor to the concentrates and render the concentrates weak or useless.

The two most common dehydrated beverage concentrates of the character referred to above are dehydrated tea and coffee concentrates. Both of these concentrates are extremely subject to rapid degradation and are rendered or reduced into sticky non-fluid matters with little flavor and/or essence when permitted to freely absorb moisture and/or when subjected to excessive heat.

The producers of granular or powdered dehydrated tea and coffee concentrates commonly store and distribute such concentrates in jars or similar containers with moisture proof lids or covers and recommend that the containers only be opened or unsealed when portions of the concentrate are to be removed and that the containers be tightly sealed at all other times so as to prevent moisture from entering the containers and adversely affecting the concentrates. Further, it is recommended that the containers be stored in cool places, such as in refrigerators, so that heat degradation will not occur or will be maintained at a minimum. It has been urged and suggested that such concentrates be stored and normally maintained at temperatures below 100° F.

In the prepared food industry, which includes restaurants and similar eating establishments and which includes coin-operated vending machines located in areas where people congregrate and are likely to seek nourishment and/or refreshment, it has become common practice to provide beverage dispensing machines for rapidly mixing measured volumes of tea or coffee concentrates with measured volumes of hot water and to dispense freshly reconstituted cups or measured portions of hot tea or hot coffee. In the case of tea, machines which mix tea concentrate with cold water to dispense portions of cold or iced tea are commonly provided.

The ordinary beverage dispensing machine, for coffee or tea, provided by the prior art, characteristically includes a supply hopper to receive and hold a supply of beverage concentrate, and intermittently operable concentrate dispensing mechanism related to the hopper and operable to dispense predetermined measured volumes of concentrate; a mixing compartment or funnel into which the dispensed concentrate is deposited; a hot water supply; valve controlled water delivery means to deliver a predetermined volume of hot water into the funnel each time a measured volume of concentrate is deposited therein; and drain means to conduct the mixed concentrate and water or the reconstituted beverage from the funnel into a waiting drinking cup or glass.

The details of construction, the complexity, cost and the effectiveness of beverage dispensing machines provided by the prior art varies widely. Some such machines are rather simple, inexpensive and relatively satisfactory in operation while others are complicated, costly and rather unsatisfactory in operation.

One major shortcoming common in the overwhelming majority of prior art beverage dispensing machines of the character referred to above resides in the great tendency for the hygroscopic particulate beverage concentrates in the hoppers and within the concentrate dispensing means to rapidly absorb moisture and to become sticky and incapable of being effectively moved and worked upon by the machines. Another major shortcoming is the tendency of the machines to heat up with resulting overheating and rapid heat degradation of the concentrates in the hoppers and in the concentrate dispensing means.

The above shortcomings result from the unavailability of appropriate and/or practical means to hermetically seal the stored concentrates in the hoppers and dispensing means from the atmosphere in and about the mixing funnels. As a result of the above, each time hot water is introduced into the mixing funnels and a volume of beverage is reconstituted therein, the dispensing mechanism and hopper are subjected to an abundance of steam or hot moisture ladened air which substantially freely enters the dispensing means and hopper to be absorbed by the concentrate therein.

In the absence of suitable means to dissipate or dispose of the excess and/or unwanted heat introduced into the machines by the hot water that is used, the hoppers and concentrate dispensing mechanisms of the prior art machines characteristically become overheated with resulting rapid heat degradation of the concentrates therein.

Yet another shortcoming and disadvantage found to exist in most if not all beverage dispensing means of the character referred to above resides in the tendency of the machines to freely release large volumes or clouds of steam or moisture ladened air each time a volume of reconstituted beverage is dispensed. These clouds or volumes of moisture saturated air condense on and about the exterior of the machines and on and about the exterior of the machines and adjacent fixtures obscure, deface and create a generally undesirable condition which requires constant cleaning up and care. The aeromatics carried by the steam and air compound the problem and are such that if the condensates are not constantly wiped off the machine and adjacent fixtures, unattractive and hard to remove beverage stains are left thereon.

As a result of the above problem, a large number of operators and/or proprietors of restaurants and the like refuse to have tea and coffee dispensing machines of the character here concerned with on their premises.

Typical efforts of the prior art to prevent the entry of moisture into the supply of concentrates in beverage dispensing machines of the character here concerned with have included the application of heat to the hoppers and/or concentrate dispensing mechanisms. Such application of heat is intended to drive off excess moisture and to keep the concentrates dry. Such efforts have met with little or no success since the amount of heat required to gain such an end is sufficient heat to melt the concentrates and cause such rapid degradation of the concentrates that the machines are rendered inoperative.

While the aforementioned problems and/or shortcomings are found in most beverage dispensing machines of the character here concerned with, such problems and shortcomings are frequently not so fast acting as to bring about or cause adverse effects in the case of machines where large volumes of beverage are dispensed and fresh supplies of concentrates must be introduced into the machines at closely spaced intervals of time. In cases where the supply of concentrate must be replenished every day, the concentrates are normally used up or consumed before material adverse effects resulting from moisture or heat degradation can take place.

On the other hand, in those cases where the supply of concentrate may have to remain in the machines for several days before all of it is used, the adverse effects brought about by moisture and/or heat degradation are commonly encountered. As a result of the above, it is generally recognized and accepted that the beverage dispensing machines of the character referred to above and provided by the prior art are only effective and practical for use in situations where sufficiently large volumes of beverage are dispensed each day so that the supply of concentrates must be regularly and frequently replenished and are not normally let to stand in the machines for more than a day or two.

As a result of the foregoing, to a substantial extent, an effective use of prior art beverage machines of the character referred to in the preceding is restricted to situations where the machines are put to high volume use. The operators or proprietors of restaurants and the like where low volume use of such machines would be likely cannot be effectively equipped with such machines.

An object of our invention is to provide a beverage dispensing machine of the general character referred to above which is such that the supply of granular or particulate dehydrated beverage concentrate contained therein is not subject to degradation as a result of humidification and/or overheating brought about by the normal use or operation of the machine.

It is an object of the invention to provide a machine of the character referred to above wherein degradation of a supply of concentrate contained therein is inhibited or slowed to an extent that the time period for normal degradation of the concentrate, to an extent which would result in adversely affecting the operation of the machine, is extended from one or two days to a week or more, thereby making the machine effective and serviceable in those situations where the volumetric output of the machine is so low that a supply of concentrate can be expected to last a week or more.

Another object of the present invention is to provide a machine of the character referred to wherein excess moisture generated by the machine is condensed within the machine and it is suitable disposed whereby fogging and/or wetting of the exterior of the machine and other fixtures and devices in close proximity to the machine, by condensed moisture exhausted from the machine, does not occur.

It is an object and feature of this invention to provide a machine of the character referred to above including; a hopper in which a supply of particulate dehydrated beverage concentrate is deposited; a compression chamber with spaced air inlet and outlet openings in which said hopper is supported; and air pump means to conduct ambient air into the compression chamber, about the hopper and out through said outlet opening whereby the hopper is air-cooled and the temperature of the hopper and of the concentrate within the hopper never exceeds a temperature of the ambient atmosphere.

Yet another object and feature of the present invention is to provide a machine of the character referred to above including a concentrate dispensing mechanism related to the hopper and having a discharge tube projecting into the outlet opening of said compression chamber whereby air flowing out through said opening, about and outward from the free end of said tube creates a minus pressure at said end of said tube to scavenge air from said tube and from the hopper and prevent moisture ladened air outward of the tube from moving inwardly therethrough and into said hopper.

Still another object and feature of the invention is to provide a machine of the character referred to which includes; a mixing funnel communicating with the discharge tube of the dispensing mechanism and said air outlet opening; a hot water supply means to deliver hot water into the funnel and a delivery duct extending from the funnel to conduct reconstituted beverage established of concentrate and water within the funnel out of said funnel and to conduct air entering the funnel through said air outlet opening from the funnel; said air flowing into and from the funnel serves to enhance the mixing of the concentrate and water and serves to flow and transport reconstituted beverage and moisture ladened air out of that funnel and from the delivery duct. Said air flowing through the funnel normally blows free moisture and moisture ladened air out and dries the funnel.

It is an object and feature of the invention to provide a machine of the character referred to including an open blending trough to receive beverage and moisture ladened air discharged from the delivery duct and which includes a beverage dispensing tube to deliver beverage into a drinking cup or the like, and a machine which includes a condensing chamber about the trough into which moisture ladened air generated by the machine and flowing into and out of said trough, is directed. Said condensing chamber has walls of heat conducting material and has a large volume whereby the pressure of air entering the condensing chamber from the trough drops to effect an immediate cooling of that air and to induce condensing of moisture carried by the air. Said condensing chamber is provided with air outlet means; defines a catch basin for condensates; and is provided with a waste line to conduct condensates away from the machine for disposal.

The general object and feature of our invention is to provide a beverage dispensing machine of the general character referred to above which includes an air pump means and air conducting means to receive air from said pump means and to direct said air to; first, air cool a supply of beverage concentrate; second, move or transport heated and moisture ladened air away from and clear of the supply of concentrate; and third, transport heated and moisture ladened air into a condensing chamber where said air is cooled and the moisture carried thereby is condensed, collected and disposed of.

It is an object of the invention to provide air pumping and conducting means of the character referred to which is such that it can be effectively related to various makes and/or designs of beverage dispensing machines provided by the prior art.

The foregoing and other objects and features of our invention will be fully understood from the following detailed description one typical preferred form and embodiment of our invention, throughout which description reference is made to the accompanying drawings in which:

FIG. 1 is an isometric view of a beverage dispensing machine embodying our invention;

FIG. 2 is a diagrammatic view illustrating our invention;

FIG. 3 is a sectional view taken substantially as indicated by line 3—3 in FIG. 1;

FIG. 4 is an enlarged detailed sectional view of a portion of the structure shown in FIG. 3;

FIG. 5 is a view of a portion of the structure shown in FIG. 4; and

FIG. 6 is an enlarged detailed sectional view of another portion of the structure shown in FIG. 3.

The beverage dispensing machine illustrated in FIG. 1 of the drawings is typical, in appearance, with many counter top type beverage dispensing machines provided by the prior art and includes a flat, horizontal base 10 with an upwardly disposed drip tray 11 at its forward portion and which a drinking cup 12 or the like can be set to be filled with beverage. The machine next includes a vertical column 14 projecting upwardly from the rear portion of the base 10 and a dispensing head 15 atop the column and projecting forwardly therefrom to overlie the drip tray. An electric power supply line E extending from a suitable power source, a hot water supply hose or line W extending from a suitable hot water supply and waste line w extending to a sewer line or the like, enter a side of the base and/or column, as desired, or as circumstances require.

A manually operable cycling switch in the form of a push button switch S is carried by the machine in convenient to engage position. The switch S is adapted to be operated or closed whenever it is desired to dispense a measured volume or portion of reconstituted hot beverage.

Additionally, a beverage dispensing tube T depends from the underside of the forward portion of the head 15. The tube T is in spaced relationship above the tray 11 and the cup 12 and is disposed to direct dispensed beverage into the cup.

Further, the head 15 has an opening in its top to accommodate the upper portion of a hopper H in which a supply of particulate dehydrated beverage concentrate is stored.

In practice, the supply of water to or for the machine can be cooled and the machine can be provided with an electric powered water heating means arranged in the base, column and/or head, without departing from the spirit of this invention.

The switch S can, if desired, be operatively related to a coin operated actuating means, suitably mounted and/or related to the cabinet structure provided without departing from the spirit of our invention.

The base 10, column 14 and head 15 shown in FIG. 1 of the drawings and described above is that cosmetic cabinetry which encloses the various working and/or functional components and/or means of the machine.

The working or functioning components and means of the machine are diagrammatically illustrated in FIG. 2 of the drawings and are structurally illustrated in FIGS. 3 through 6 of the drawings.

Referring to FIGS. 2 through 6 of the drawings, the machine includes an upper, upwardly opening, hopper H with a cover or lid 20. The hopper H is adapted to receive and hold a supply of particulate dehydrated beverage concentrate such as instant tea or instant coffee (not shown). The machine next includes a concentrate dispensing mechanism or means D at and communicating with the bottom of the hopper H and operable to intermittently dispense that predetermined volume of concentrate required to make one cup of reconstituted beverage. The means D is preferably though not necessarily driven by a motor M. The motor M is set in motion to effect discharge or dispensing of concentrate by manual closing of the aforementioned switch S. A timing means C is interposed between the switch S and the motor M for the means D whereby, upon closing of the switch S, the motor runs that predetermined period of time necessary to dispsense the desired amount of concentrate.

In practice, the means D is provided with a downwardly projecting discharge tube 21 through which the dispensed concentrate is conducted.

The machine next includes a mixing compartment or funnel F into which the dispensed concentrate issuing from the tube 21 of the means D is deposited and into which a measured volume of hot water, sufficient to make portion of reconstituted beverage is delivered by a water supply means. The water supply means includes a water delivery line 22 extending from a normally closed electrically operated valve V to the funnel F. The valve V is connected with and receives hot water from the hot water supply line W. The valve V, like the motor M, is electrically connected with the timer C so that each time the switch is closed, the valve opens for that predetermined period of time necessary to deliver the required volume of hot water into the funnel F. The funnel F has a depending delivery tube through which the mixed concentrate and water, within the funnel, freely drains.

The machine next includes an upwardly opening blending trough B to receive the mixed beverage flowing from the funnel. The trough B allows the newly mixed and reconstituted beverage to blend and settle, that is, to spend any excess turbulence and to permit foam that might develop during mixing to break down and/or settle out.

The trough B carries the aforementioned dispensing tube T which depends from the head H of the cabinet and directs the reconstituted beverage into the cup 12 on the drip tray 11 of the machine.

The drip tray 11, below the tube T and on which the cup 12 is supported can be suitably connected with the drain line w which extends to a suitable sewer system or the like.

The machine thus far described is essentially the same as many beverage dispensing machines provided by the prior art and which are in common use.

The only possible exception to the above resides in the fact that most common machines do not include the above noted blending trough B.

In addition to the foregoing and in accordance with out invention, the machine is provided with or next includes a sheet metal box or case G defining a compression chamber X in which the hopper H and concentrate dispensing means D are arranged. The hopper H and means D are preferably freely supported within the chamber X so that the means D and as much of the hopper H as is possible, are spaced from the walls of the case G.

The case G is provided with an air inlet opening O which is preferably located in the upper rear portion of the case and is provided with an air outlet opening O' which is at the lower forward portion or bottom of the case, substantially concentric with the discharge tube 21 of the means D and into which said tube 21 freely projects.

The machine next includes air pump means A mounted at the exterior of the case G and operating to drive air, under limited pressure and in substantial volume, through the opening O and into the chamber X. The means A can, as illustrated, be a simple electric motor driven fan suitably mounted on the case in axial alignment with and overlying the exterior of the opening O.

It is to be noted and it will be apparent that the means A can vary widely in form and that the air delivered thereby can be introduced into the chamber X in any suitable manner and at any suitable location about the case G, without departing from the spirit of our invention.

Air delivered into the chamber X by the means A flows about the hopper H and about the dispensing means D to cool and maintain the temperature of the hopper and of the dispensing means and the temperature of the concentrate within the hopper and the dispensing means at about the temperature of the ambient air outward of the machine.

In practice, it is preferred that the opening O be at one side or at the rear of the case wherein steam or hot moisture ladened air that might rise about the front of the machine is not driven into the chamber.

It is to be noted that in the overwhelming number of situations, the machines are used in areas where food is served and where creature comfort requires that the temperature of the ambient atmosphere be in the low to mid seventies. Accordingly, the temperature of the concentrate in our machine is, except for rare and unusual circumstances, maintained well below 100° F. and is ordinarily maintained between 70° and 80°. Heat degradation of the concentrate is rather slow in the 70°-80° range and, generally, does not accelerate appreciably until temperatures in excess of 100% are encountered.

The air pumped into and flowing through the chamber X leaves or exits the chamber through the opening O'. As the air flows outwardly through the opening O', its velocity is increased due to the restrictive nature of the opening. The air flowing out through the opening O' flows axially with and about the exterior of the discharge tube 21 of the means D which tube is arranged concentric with the opening O'. As the air moves beyond the lower free end of the tube 21, it creates a minus pressure at that end of the tube. The noted minus pressure induces a flow of air within the hopper out through the means D and its tube 21 and effectively prevents any flow of air upwardly through the means D and into the hopper. The minus pressure established at the free end of the tube 21 normally establishes the minus pressure in the hopper which rarifies the air in and about the concentrate therein and maintains the moisture level in the hopper at a minimum. Additionally, the noted minus pressure effectively induces the free flow of dispensed particles of concentrate down and out through the tube 21.

In practice, the opening O' can be formed or provided with an annular axially extending flange like flow tube to assure that the air flowing about said tube 21 establishes a sufficiently well defined column of air to assure establishment of the desired or sought after minus pressure at the lower end of the tube.

In practice, the opening O' can be provided with a Venturi throat by suitably forming the material of the case G or by means of a separate Venturi insert engaged in the opening in the case.

The mixing container or funnel is an elongate vertical funnel shaped unit having a cylindrical upper portion 30, a downwardly convergent bottom or lower portion 31, and is provided with or includes a lower, central, depending and downwardly opening delivery duct 32. The upper rim portion of the funnel is engaged with the bottom of the cases G in substantial sealed relationship therewith and about the opening O', whereby the funnel establishes a mixing chamber Y with which the opening O communicates and into which concentrate issuing from the duct 21 and air flowing through the opening O' are directed.

The funnel F next includes a water inlet passage 33 which enters one side of the upper cylindrical portion 30 on an axis substantially tangential with the inside surface of the portion 30. The passage 33 extends through a hose coupling nipple 34 at the exterior of the funnel. The nipple 34 connects with the hot water delivery line 22 noted in the preceding.

With the above noted relationship of parts, it will be noted that hot water introduced into the funnel or chamber Y flows circularly about the interior of the funnel, within the chamber Y, to effectively mix with the concentrate deposited in the funnel or chamber and effectively washes down the inside surfaces of the funnel so that concentrate is not subject to sticking and collecting on the walls of the funnel.

As the concentrate and water mix in the chamber Y, the desired beverage is reconsituted and flows directly downwardly through and from the duct or tube 32. Air flowing through the opening O' and downwardly through the funnel F or chamber Y serves to induce the flow of beverage out of the funnel, blows and/or carries with it steam or moisture ladened air which develops in the chamber Y or funnel as a result of the introduction of hot water therein.

Further, after each portion or batch of beverage has been drained from the funnel, the continuing flow of air through the funnel effectively blows on and dries the side walls of the funnel and effectively exhausts all free moisture therefrom.

The above noted funnel F and the aforementioned upwardly opening blending trough B into which beverage flowing from the funnel is deposited are arranged in a condensing chamber Z. The chamber Z is preferably defined by a housing structure or case J having a large surface area and established of sheet metal having a high coefficient of heat conductivity. The case J or chamber Z function to receive the steam and moisture ladened air generated in the chamber Y and in the trough B and which flows freely from the open top of the trough B.

The case J is provided with air outlet means K to relieve the chamber of all back pressure and to exhaust and dispose of air flowing into said chamber. The air outlet means can be a single large outlet opening in a side wall of the case J or can be a plurality of small apertures spaced over a large surface area of the case J, as desired, or as circumstances require. The case J next includes an opening through which the downwardly projecting discharge duct T of the trough B projects in substantial sealed relationship.

Finally, the case G includes or is formed to establish a catch basin 40, at its bottom, to collect fluids condensed in the chamber Z. The catch basin 40 is provided with an outlet fitting or nipple 41 suitably connected with the waste line w by means of a connecting tube or line 42.

Alternatively, a waste receiving vessel can be removably arranged within the machine to occur below the catch basin and to receive and collect the condensates.

The volumetric capacity of the chamber C is preferably sufficiently large so that substantially all pressure on the hot moisture ladened air flowing into the chamber from the trough B is released. Accordingly, the air, upon being introduced into the chamber Z is subjected to an immediate pressure drop. That pressure drop, though slight, assists or enhances the moisture carried by the air to condense.

The case J and/or chamber Z is effective to condense substantially all excess moisture in the air flowing into it and is such that air exhausted from the chamber carries an insufficient amount of moisture to create any appreciable adverse condensation in and about the machine when it reaches and joins with the ambient atmosphere.

In practice, the cases G and J establishing the chambers X and Z can be separate or independent structures or can, as shown in FIG. 3 of the drawings, be cooperatively related so that the bottom of the case G establishes the top of the case J.

Further, in practice, the case J need not accommodate the funnel F. It would suffice if the case J only accommodated and enclosed the blending trough B or was so related to the trough B to freely receive all of the moisture ladened air flowing out through and from the open top of the trough.

The structure shown in FIGS. 3 through 6 of the drawings is illustrative of one structural embodiment of our invention which has been reduced to practice and which effectively performs the functions and attains the ends recited in the foregoing.

The only structural features illustrated in FIGS. 3 through 6 of the drawings not adequately covered in the foregoing and which merit particular mention are; the aforementioned parts and components of the machine are arranged within the head 15 of the cabinet structure shown in FIG. 1 of the drawings; the air pump A or motor driven fan is arranged on the rear side of the case G to occur in a space between that side of the case G and a rear wall 50 of the head 15; the rear wall 50 of the head 15 is provided with air inlet means 51 in the form of leuvre openings; the concentrate dispensing means D is a motor driven auger type means incorporated in or with the lower or bottom end of the hopper H; the motor M of or for the means D is mounted on the rear side of the case G to occur in the space between the case and the rear wall 51 of the head 15; the top of the case G is defined by the top of the head 15 and is provided with an opening to accommodate and support the upper open end portion of the hopper H, which end of the hopper is normally closed by the aforementioned cover 20. Additionally, and as shown in FIG. 6 of the drawings, the funnel F has a flange 60 about its upper rim to engage the bottom surface of the case G. The bottom of the case G is provided with suitable clips 61 at its bottom surface to engage the flange 60 and hold the funnel up and in desired engagement with the bottom of the case G, as illustrated in FIG. 5 of the drawings. The trough B is provided with an apertured top wall 70 overlying one portion thereof and through which the tube 32 of the funnel F is engaged, whereby the funnel and trough are suitably coupled in desired working relationship. Finally, the lower portion of the trough B finds vertical support on the bottom of the case J adjacent an opening 71 provided in the case J to accommodate the dispensing tube T.

Since the structure necessary to reduce our invention to practice is subject to substantial variation without affecting or departing from the spirit of our invention, further detailed consideration and description of the particular structure shown in the drawings can only serve to unnecessarily burden this disclosure. Accordingly, further detailed description of the structure shown will be dispensed with.

In summation, it will be apparent that we have invented and provide novel air circulating and/or handling means for hot beverage dispensing machines which air handling means effectively air cools a supply of beverage concentrate so as to prevent degradation thereof; conducts and/or carries all moisture ladened air and/or free fluids away from and out of the presence of the supply of concentrate to prevent moisture degradation of the concentrate and which effectively condenses, collects and disposes of free moisture generated by the machine during its normal use and thereby prevents the discharge or escape from the machine of the moisture ladened air which is likely to condense on and deface or otherwise work adverse effects upon the exterior of the machine and on other structures and/or fixtures in close proximity thereto.

Having described only one typical preferred form and application of our invention, we do not wish to be limited to the specific details herein set forth, but wish to reserve to ourselves any modifications and/or variations that may appear to those skilled in the art and which fall within the scope of the following claims:

Having described our invention, I claim:

1. A beverage dispensing machine comprising a hopper holding a supply of particulate dehydrated beverage concentrate, a concentrate dispensing means connected with the hopper; said dispensing means has a dispensing duct with an outlet end and is intermittently operable to transport a predetermined volume of concentrate from the hopper outwardly through a dispensing duct, a funnel defining a mixing chamber receiving concentrate from the dispensing means, water supply and delivery means delivering a predetermined volume of water into the mixing chamber each time concentrate is received thereby and establishing reconstituted beverage in the mixing chamber, an outlet tube extending from the funnel to exhaust moisture-ladened air and to drain beverage from the mixing chamber, a case about the hopper and dispensing means and defining a compression chamber, an air inlet opening in the case opening to the ambient atmosphere, air pump means at said air inlet opening delivering air at greater than atmospheric pressure into the compression chamber to cool said hopper and dispensing means and the concentrate therein, an air outlet opening in the case communicating with the mixing chamber, the outlet end of the dispensing duct is positioned at said air outlet opening whereby air flowing through the outlet opening about the dispensing duct and into the mixing chamber establishes a minus pressure at the outlet end of the dispensing duct to draw air outward through and prevent the flow of moisture-ladened air inward through that duct; air moving into the mixing chamber moves out of said chamber through said outlet tube transporting beverage and moisture-ladened air out of the mixing chamber, a second case defining a condensing chamber into which the outlet tube projects, a blending trough within the condensing chamber and receiving beverage and moisture-ladened air flowing through and from the outlet tube, said trough is open whereby moisture-ladened air flows therefrom into the condensing chamber, said second case has air outlet means to exhaust air from within the condensing chamber, said second case has a lower portion defining a condensate catch basin, said trough includes a dispensing tube depending through and from the second case to drain the trough and dispense beverage from the machine.

2. The machine set forth in claim 1 wherein the concentrate dispensing means includes a motor driven rotatable auger at the bottom of the hopper and operable to advance concentrate from the hopper to the dispensing duct when the motor is energized and the auger is rotated.

3. The machine set forth in claim 1 wherein the water supply and delivery means includes a hot water heater to heat a supply of pressurized water, a water delivery line from the heater to the funnel and a normally closed electrically operated on and off valve in the delivery line, the concentrate dispersing means includes a motor driven rotatable auger at the bottom of the hopper to dispense concentrate through the duct when the motor is energized and the auger is rotated.

4. The machine set forth in claim 1 wherein the concentrate dispensing means includes a motor driven rotatable auger at the bottom of the hopper to dispense concentrate through the duct when the motor is energized and the auger is rotated, an electric power supply, said air pump means comprising a motor driven fan connected with the power supply, cycling means to intermittently energize the motor and the valve and including a normally open timer switch connected with and between the power supply and the motor and the valve and a manually operable cycling switch connected with and between the power supply and the timer switch, said timer switch closing power circuits to the motor and the valve for predetermined periods of time each time the cycling switch is operated, the water supply and delivery means includes a hot water heater to heat a supply of pressurized water, a water delivery line from the heater to the funnel and a normally closed electrically operated on and off valve in the delivery line.

5. The machine set forth in claim 4 wherein the water supply and delivery means includes a hot water heater to heat a supply of pressurized water, a water delivery line from the heater to the funnel and a normally closed electrically operated on and off valve in the delivery line.

* * * * *